(12) United States Patent
Luhta et al.

(10) Patent No.: US 8,405,040 B2
(45) Date of Patent: Mar. 26, 2013

(54) IMAGING DETECTOR THERMAL CONTROL

(75) Inventors: Randall P. Luhta, Highland Heights, OH (US); Marc A. Chappo, Elyria, OH (US); Roland Proksa, Neu Wulmstorf (DE); Douglas B. McKnight, Highland Heights, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 12/853,349

(22) Filed: Aug. 10, 2010

(65) Prior Publication Data

US 2011/0049381 A1 Mar. 3, 2011

Related U.S. Application Data

(60) Provisional application No. 61/237,056, filed on Aug. 26, 2009.

(51) Int. Cl.
*G01T 1/24* (2006.01)
(52) U.S. Cl. .................................. 250/370.15

(58) Field of Classification Search ............. 250/370.15;
*G01T 1/244*
See application file for complete search history.

(56) References Cited

U.S. PATENT DOCUMENTS

| | | | |
|---|---|---|---|
| 4,052,620 A | 10/1977 | Brunnett | |
| 4,068,306 A | 1/1978 | Chen et al. | |
| 5,103,092 A | 4/1992 | Takahashi et al. | |
| 6,510,195 B1 | 1/2003 | Chappo et al. | |
| 6,671,345 B2 | 12/2003 | Vrettos et al. | |
| 6,925,142 B2 * | 8/2005 | Pohan et al. | 378/19 |
| 7,113,563 B2 | 9/2006 | Kamimura et al. | |
| 7,489,883 B2 | 2/2009 | Rossi et al. | |
| 2007/0158575 A1 * | 7/2007 | Heismann et al. | 250/370.15 |
| 2008/0116387 A1 * | 5/2008 | Astley et al. | 250/370.15 |

* cited by examiner

*Primary Examiner* — Constantine Hannaher

(57) ABSTRACT

An imaging detector includes a radiation sensitive region having first and second opposing sides. One of the first or second sides senses impinging radiation. The detector further includes electronics located on the other of the first or second sides of the radiation sensitive region. The electronics includes a thermal controller that regulates a temperature of the imaging detector.

33 Claims, 8 Drawing Sheets

IMAGING DETECTOR THERMAL CONTROL

CROSS REFERENCE TO RELATED APPLICATIONS

This application claims the benefit of U.S. provisional application Ser. No. 61/237,056 filed Aug. 26, 2009, which is incorporated herein by reference.

DESCRIPTION

The following generally relates to thermal control of an imaging detector and finds particular application to computed tomography (CT). However, it also amenable to other medical imaging applications and to non-medical imaging applications.

A computed tomography (CT) scanner includes an x-ray tube mounted on a rotatable gantry that rotates around an examination region about a longitudinal or z-axis. The x-ray tube emits radiation that traverses the examination region and a subject or object therein. A detector array subtends an angular arc opposite the examination region from the x-ray tube. The detector array detects radiation that traverses the examination region and generates a signal indicative thereof. A reconstructor reconstructs volumetric image data indicative of the signal. The volumetric image data can be further processed to generate one or more images of the subject or object.

Depending on the scanner, the detector array may include integrating and/or photon counting radiation sensitive pixels. With some detector configurations, the radiation sensitive pixels are in thermal communication with front-end electronics. For example, in some configurations that front-end electronics are coupled to a radiation sensitive region of the detector through one or more layers. The front-end electronics consume power and produce heat, which transfers to and heats up the detector, and variations in the power consumption of the front-end electronics can produce temperature variations in the radiation sensitive pixels.

The response of the radiation sensitive pixels is sensitive to and may vary with temperature, and, unfortunately, temperature variations in the radiation sensitive pixels may result in ring artifacts being introduced into the image data. One trend has been to employ stringent temperature control for the detector array. In one instance, this includes maintaining the detector array within a predetermined temperature range via a control loop including temperature sensors and heaters, fans, heat sinks, etc. However, such temperature control can be costly, and imaging performance can still be compromised if the temperature control is not adequate.

Aspects of the present application address the above-referenced matters and others.

According to one aspect, an imaging detector includes a radiation sensitive region having first and second opposing sides. One of the first or second sides senses impinging radiation. The detector further includes electronics located on the other of the first or second sides of the radiation sensitive region. The electronics includes a thermal controller that regulates a temperature of the imaging detector.

In another embodiment, a method includes regulating a temperature of a radiation sensitive detector module using electronics integrated in the radiation sensitive detector module.

In another embodiment, a radiation sensitive detector module includes electronics that are in thermal communication with the radiation sensitive detector module. The electronics regulates a temperature of the radiation sensitive detector module.

The invention may take form in various components and arrangements of components, and in various steps and arrangements of steps. The drawings are only for purposes of illustrating the preferred embodiments and are not to be construed as limiting the invention.

Figure 1:
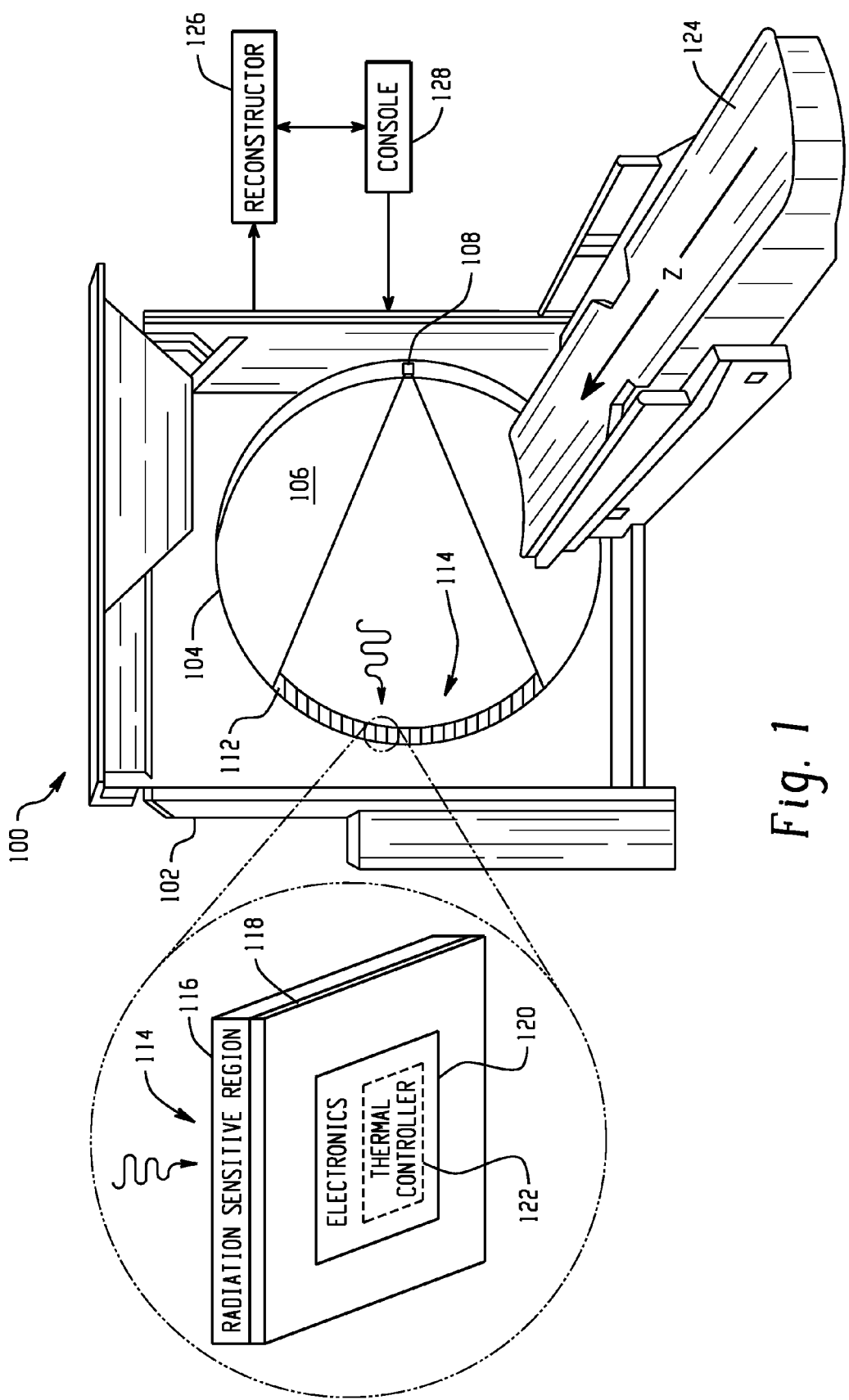
FIG. 1 illustrates an example imaging system, including a detector array with a detector module with thermal control.

FIG. 1 illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis. A radiation source 108, such as an x-ray tube, is supported by the rotating gantry 104 and emits radiation that traverses the examination region 106.

A radiation sensitive detector array 112 subtends an angular arc opposite the radiation sources 108 across the examination region 106 and detects radiation traversing the examination region 106. In the illustrated embodiment, the radiation sensitive detector array 112 includes a plurality of detector modules 114 arranged with respect to each other along a direction transverse to the z-axis. The detector modules 114 may be one or two-dimensional and may include integrating and/or photon counting detectors.

The illustrated detector module 114 includes a radiation sensitive region 116 (which faces the radiation traversing the examination region 106) coupled to a first side of a substrate 118 and electronics 120 coupled to an opposing side of the substrate 118. The radiation sensitive region 116 and the electronics 120 are in communication through electrically conductive pathways in vias in the substrate 118. As described in greater detail below, in another embodiment the substrate 118 is omitted and the electronics 120 are coupled to the radiation sensitive region 116.

The electronics 120 includes a thermal controller 122, which regulates the temperature of the detector module 114. As described in greater detail below, the thermal controller 122 senses or receives a sensed signal indicative of a temperature of the detector module 114 and regulates the temperature of the module 114 based on the sensed temperature and a predetermined set point temperature.

A patient support 124, such as a couch, supports an object or subject such as a human patient in the examination region 106. A reconstructor 126 reconstructs the signal from the detector array 112 and generates volumetric image data indicative thereof. A general-purpose computing system serves as an operator console 128. Software resident on the console 128 allows the operator to control the operation of the system 100 such as selecting a protocol, initiating scanning, etc.

Figure 2:
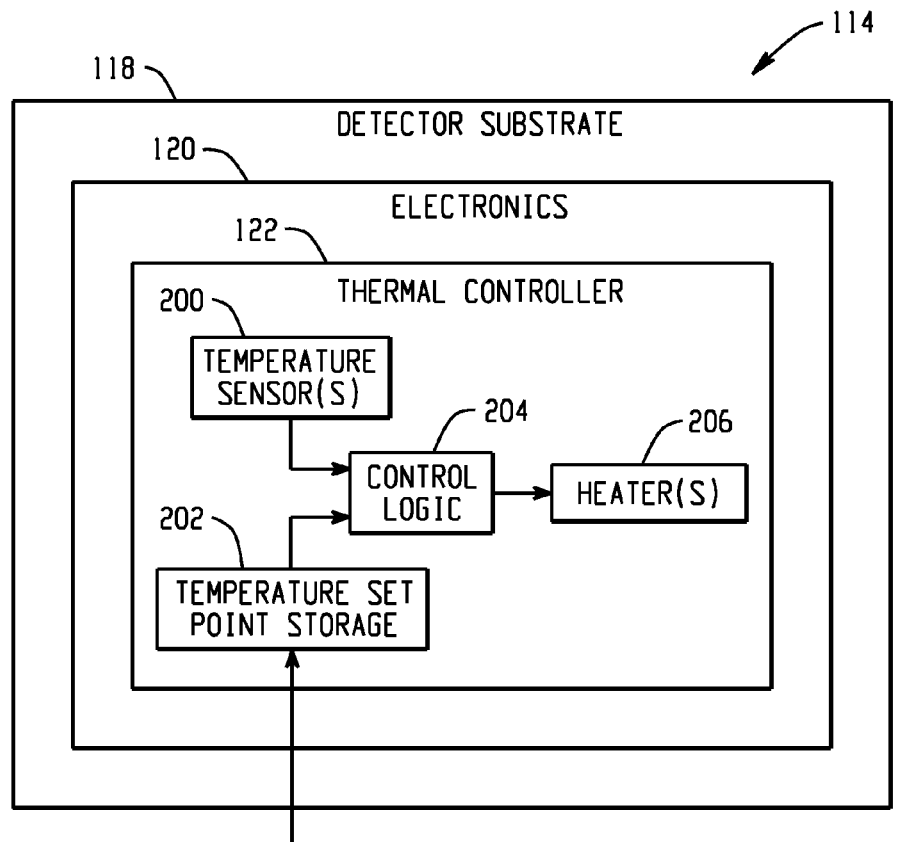
FIG. 2 illustrates example thermal control circuitry with a heater internal to the electronics of the module.

FIG. 2 illustrates a non-limiting embodiment of the thermal controller 122 of a module 114. The illustrated thermal controller 122 includes at least one set of temperature sensors 200 that sense a temperature of the module 114. Suitable temperature sensors include, but are not limited to, a temperature sensitive diode, a transistor (e.g., a bipolar transistor), a resistor, and/or another electrical element.

Where the thermal controller 122 includes two or more temperature sensors 200, the temperatures sensed by one of the sensors 200, an average of two or more sensed temperatures, or other sensed temperature can be used as the module 114 temperature. A temperature sensor outside of the thermal controller 122 can alternatively or additionally be used to sense a temperature of the module 114.

Temperature set point storage 202 stores one or more temperature set points. The storage 202 can be computer readable storage medium such as a memory like a register of the electronics. Stored temperature set points may include a general temperature step point for the modules 114, a scanner location-specific set point, a set point optimized for the scanner, and/or another set point. The illustrated storage 202 may be programmable and can be written with a set point during manufacturing, while at a health care facility, etc. Alternatively, the storage 202 may include read only memory.

Control logic 204 generates a control signal based on the sensed temperature from the one or more temperatures sensors 200 and a temperature set point from the storage 202. In one instance, the signal includes a characteristic (e.g., amplitude, sign, frequency, etc.) such as an electrical characteristic indicative of a difference between the sensed temperature and the set point temperature.

A heater 206 generates heat based on the control signal. The heat is absorbed by and dissipates via the module 114. The heat may facilitate increasing the temperature of the module 114 or maintaining the temperature of the module 114 within a predetermined temperature range about the temperature set point value.

The thermal controller 122 can be implemented via analog and/or digital electronics.

Figure 3:
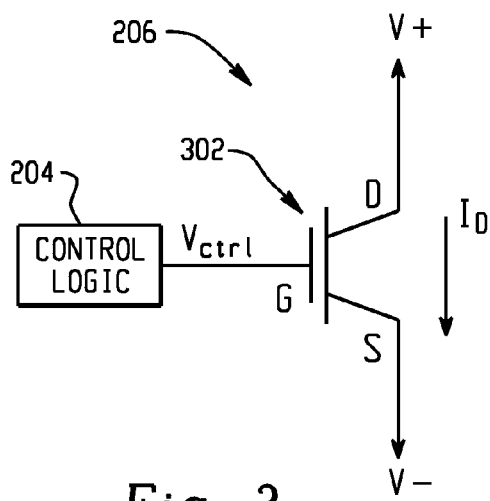
FIGS. 3 and 4 illustrate example heaters of the thermal control circuitry of FIG. 2.
Figure 4:
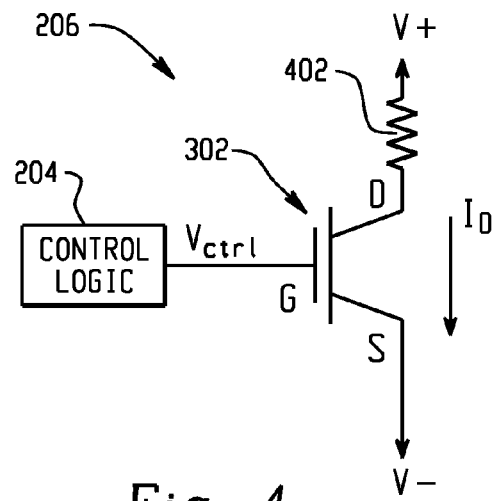

FIGS. 3 and 4 illustrate examples of the heater 206.

In FIG. 3, the heater 206 includes a transistor 302. The illustrated transistor 302 is an N-channel field-effect transistor (FET); however, other types of transistors can be alternatively used. In the Illustrated embodiment, V+ is applied to the drain (D) of the transistor 302 and V− is applied to the source (S) of the transistor 302. The signal from the control logic 204, $V_{ctrl}$ in this example, is applied to the gate (G) of the transistor 302.

As discussed herein, the signal (again, $V_{ctrl}$ in this example) generated by the control logic 204 is indicative of the difference between the sensd and set point temperatures. If $V_{ctrl}$ reaches a threshold voltage of the transistor 302, the transistor is turned "on." That is, a conductive channel is formed between the drain and the source, and a current ($I_D$) flows from the drain to the source. The conductivity of the channel and hence $I_D$ increases with the an increasing $V_{ctrl}$. The power consumed by the transistor 302 is a function of $(V+-V-)I_D$.

In FIG. 3, turning the transistor "on" causes the transistor 302 to conduct heat, and the transistor 302 heats up and is used as the heater 206. The heater 206 in FIG. 4 is substantially similar to the heater 206 of FIG. 3 except that the drain includes a resistor 402 as a heating element that consumes power and dissipates heat.

Figure 5:
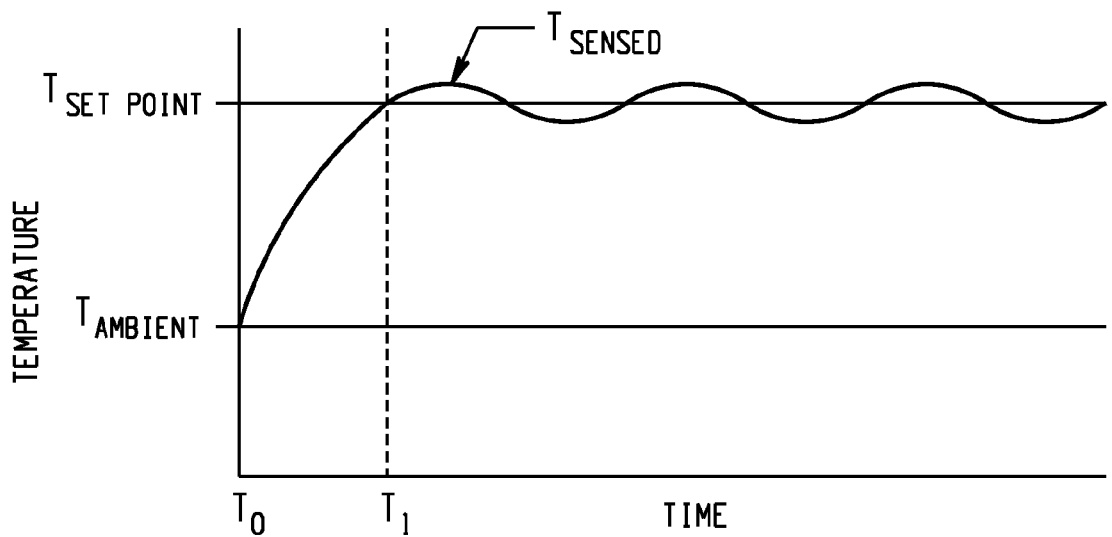
FIG. 5 illustrates an example diagram showing thermal control of the detector module.

FIG. 5 shows an example in which the thermal controller 122 regulates the temperature of the module 114. For this example, the initial temperature of the module 114 (at $T_0$) is ambient temperature ($T_{ambient}$). At $T_0$, the signal generated by the control logic 204 is indicative of the difference between $T_{set\,point}$ and $T_{sensed}$ (which is equal to $T_{ambient}$).

Between $T_1$ and $T_0$, the power consumed by the heater 206 is used to increase the temperature of the module 114 up to $T_{set\,point}$. Once at $T_{set\,point}$, the heater 206 is used to maintain the temperature of the module 114 within a predetermined temperature range about $T_{set\,point}$. In this example, if the thermal controller 122 is de-activated, the temperature of the module 114 will decreases towards $T_{ambient}$.

Figure 6:
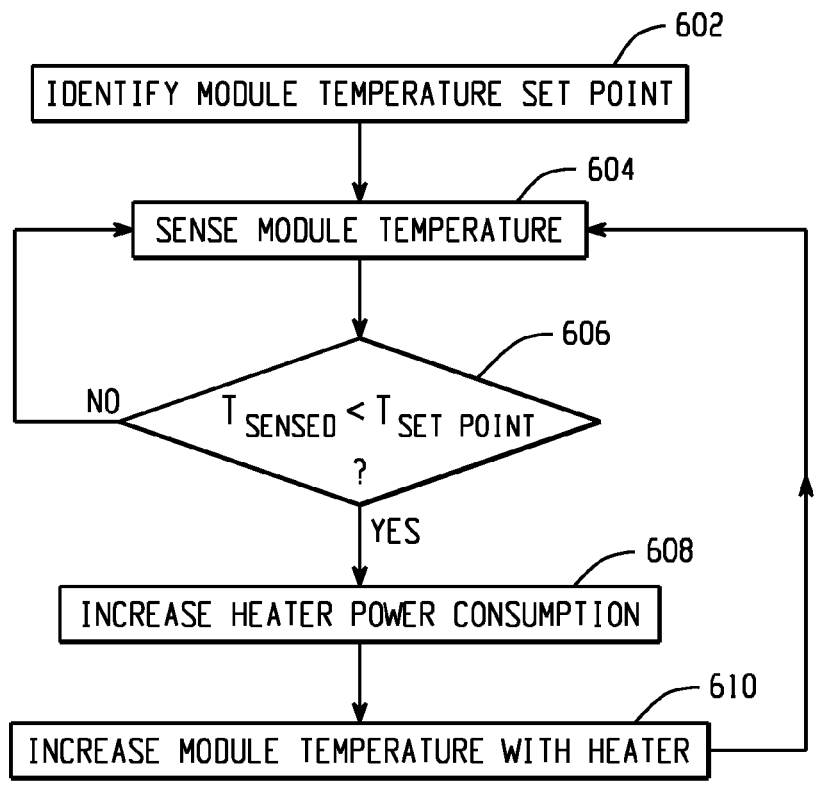
FIG. 6 illustrates an example flow chart for thermal control of the detector module.

FIG. 6 illustrates example flow for regulating the temperature of a module 114.

At 602, a temperature set point range is identified. The range may be a temperature set point stored in the storage 202.

At 604, a sensor such as the sensor 200 senses a temperature of the module 114. It is to be appreciated that the temperature of the module 114 can alternatively be sensed by another component such as another component of the electronics 120 or a sensor remote from the thermal controller 122.

At 606, the control logic 204 compares the sensed temperature and the set point temperature. If the sensed temperature is within the set point temperature range, then the heater 206 is used to maintain the temperature, and flow returns to act 604.

If the sensed temperature is less than the set point temperature, then at 608 the control logic 204 generates a control signal that increases heater power consumption.

At 610, the increased power consumption of the heater 206 produces heat that is absorbed by and increases the temperature of the module 114, and flow returns to act 604.

Variations and/or other embodiments are discussed.

The illustrated detector module 114 includes the substrate 118. In another embodiment, the substrate 118 is omitted. In such an embodiment, the electronics 120 are coupled to the side of the radiation sensitive region 116 opposite the side of the radiation sensitive region 116 that faces the impinging radiation. In an embodiment in which the radiation sensitive region 116 includes a direction conversion material such as CdTe, the electronics are coupled to the direction conversion material. In an embodiment in which the radiation sensitive region 116 includes a scintillator array coupled to a photodiode array, the electronics are coupled to the photodiode array. In one instance, silicon of a photodiode array serves as a substrate for silicon-based electronics.

Figure 7:
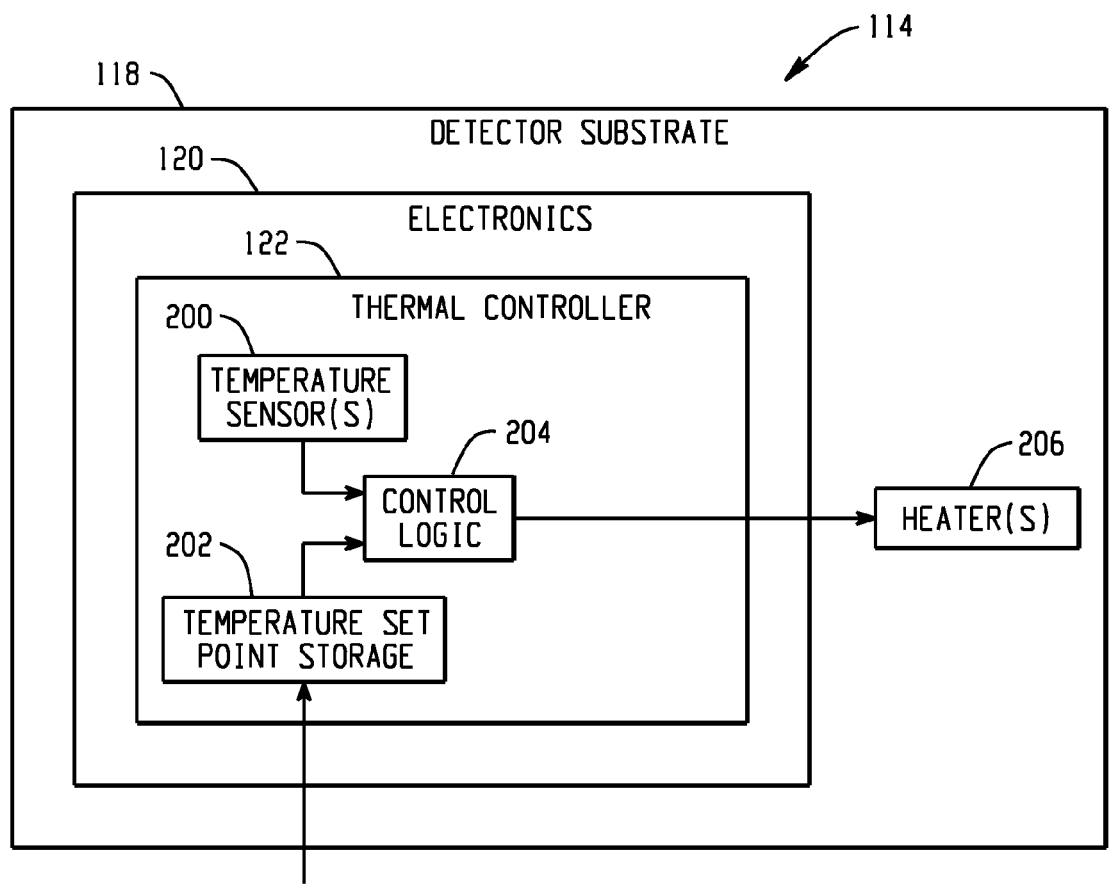
FIG. 7 illustrates example thermal control circuitry with a heater external to the electronics of the module but on the module.

FIG. 7 is substantially similar to FIG. 2, except that the set of heaters 206 is located on the substrate 118 outside of the electronics 120. The illustrated location of the set of heaters 206 is for explanatory purposes and it is to be appreciated that the heaters 206 can be variously located on the substrate 118. In one instance, the heaters 206 are symmetrically distributed about the substrate 118 to facilitate uniform heating of the module 114. In another instance, the set of heaters 206 is otherwise arranged on the substrate 118.

Figure 8:
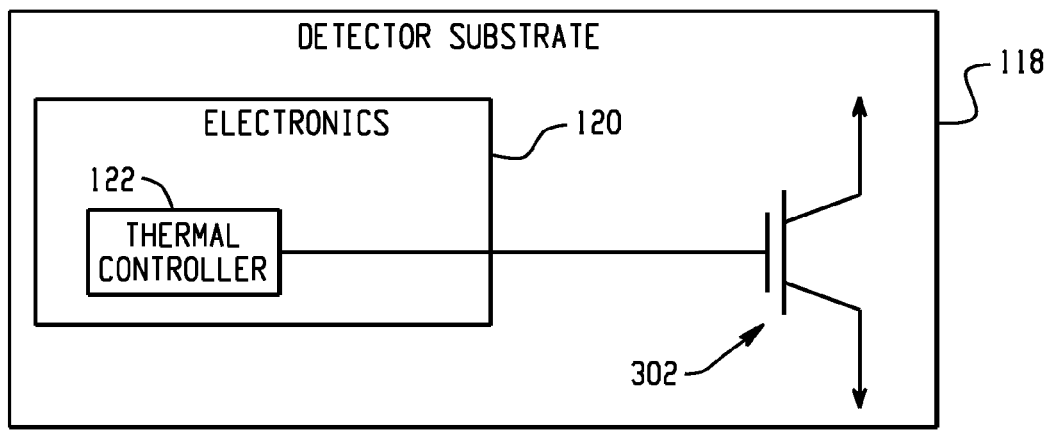
FIGS. 8, 9 and 10 illustrate example heaters for the thermal control circuitry of FIG. 7.
Figure 9:
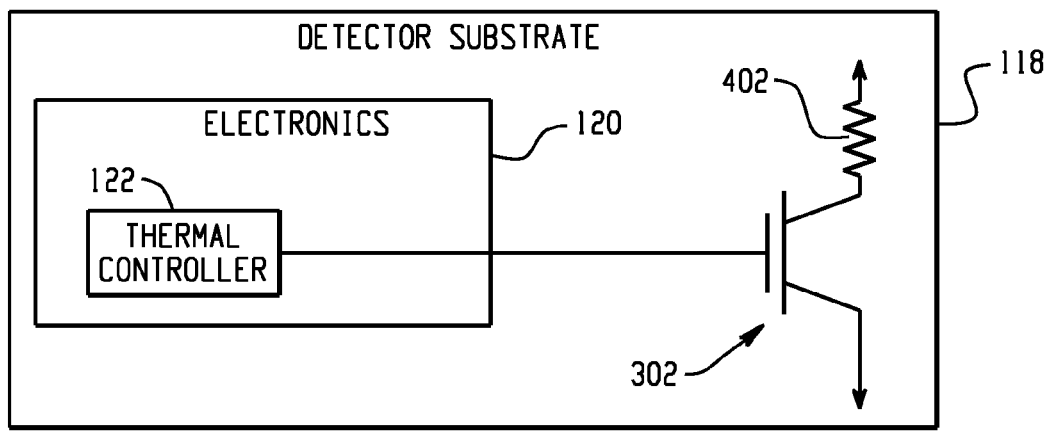
Figure 10:
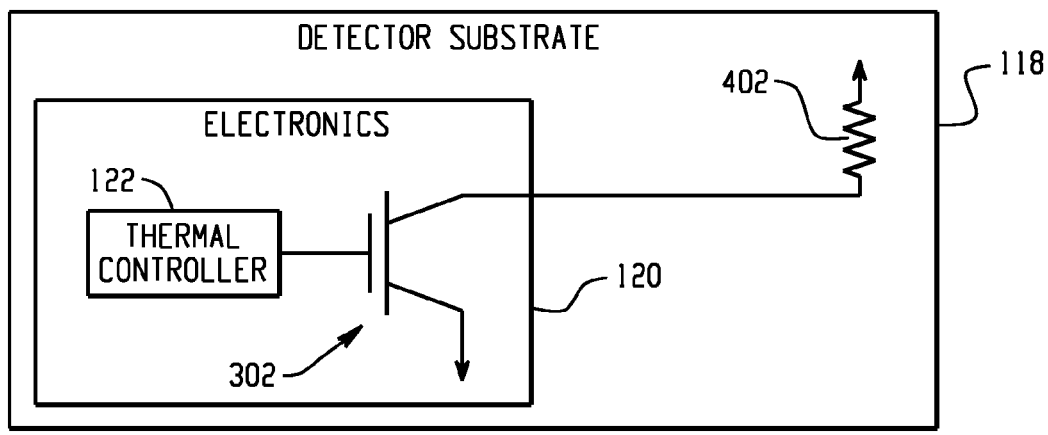

FIGS. 8, 9 and 10 illustrate various embodiments of the heaters 206 for the embodiment of FIG. 7. In FIG. 8, the heater 206 includes the transistor 302, as described in connection with FIG. 3, except that the transistor 302 is located on the substrate 118 outside of the electronics 120.

In FIG. 9, the heater 206 includes the transistor 302 and the resistor 402, as described in connection with FIG. 4, except that the transistor 302 and the resistor 402 are located on the substrate 118 outside of the electronics 120. In the embodiment of FIG. 10, the transistor 302 is located in the electronics 120 and the resistor 402 is located on the substrate 118 outside of the electronics 120.

With FIGS. 8-10, the power supplies for the sets of heaters 206 external to the electronics 120 may be the same as the power supply of the electronics 120. In another instance, these power supplies are different. Using different power supplies may facilitate mitigating transients on the electronics power supply.

With respect to FIGS. 9 and 10, it is to be appreciated that the resistor 402, which is used as part of the heater 206, may also be part of other circuitry of the module 114.

Figure 11:
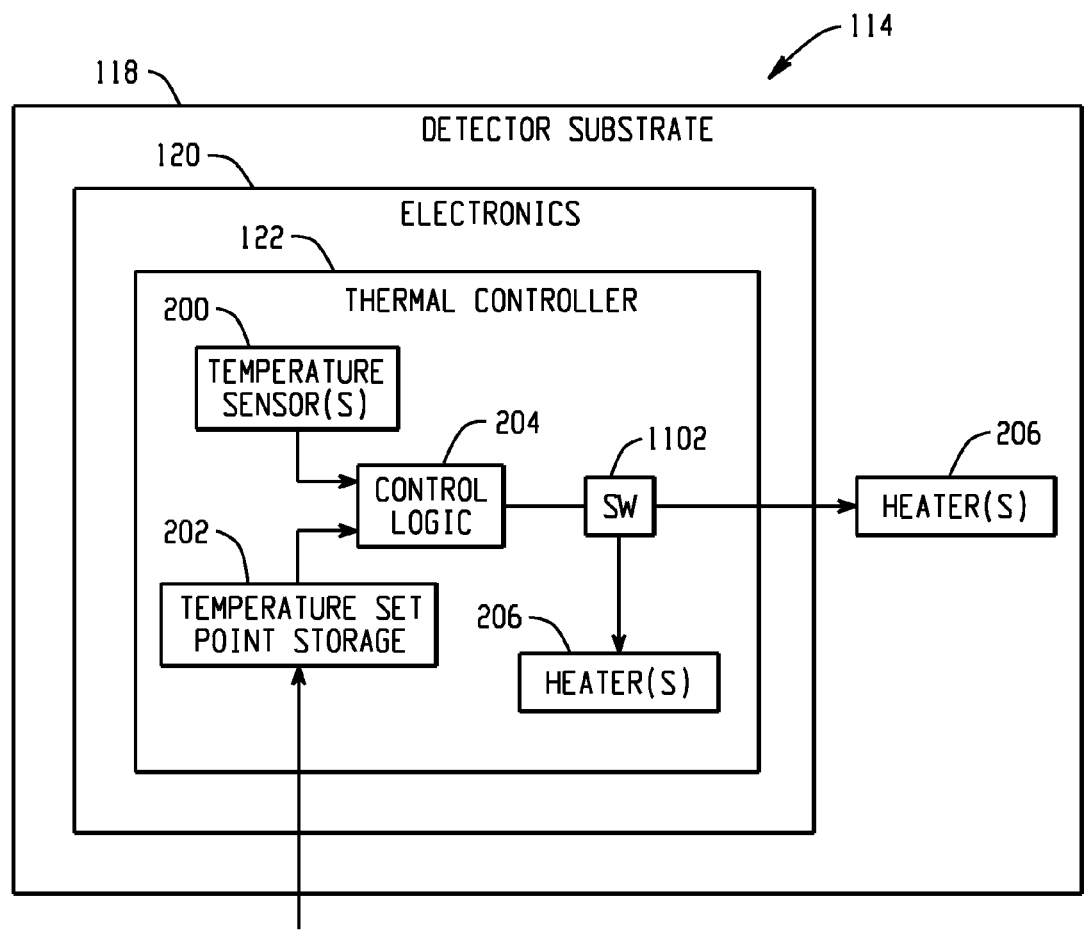
FIG. 11 illustrates example thermal control circuitry with heaters internal and external to the electronics of the module.

FIG. 11 illustrates an example with a set(s) of heaters 206 internal to the electronics 120 and a set(s) of heaters 206 external to the electronics 120 and on the substrate 118. A switch (SW) 1102 is used to select which set of heaters 206, the internal or external, is used. In this example, the switch 1102 is configured to toggle between the internal and external heaters 206.

In another instance, the switch 1102 is configured to select neither set of heaters 206, one of the internal or external set of the heaters 206, the other of set of the internal or external set of the heaters 206, or, concurrently, both the internal and the external set of the heaters 206.

In one embodiment, the switch 1102 is controlled by a user input, for example, a technician or other authorized personnel. In another embodiment, the console 128 or the system 100 determines which, if any, of the sets of heaters 206 are employed. This determination can be based on a difference between the sensed temperature and the set point temperature and a threshold level, the selected scanning protocol, the ambient temperature, etc.

Figure 12:
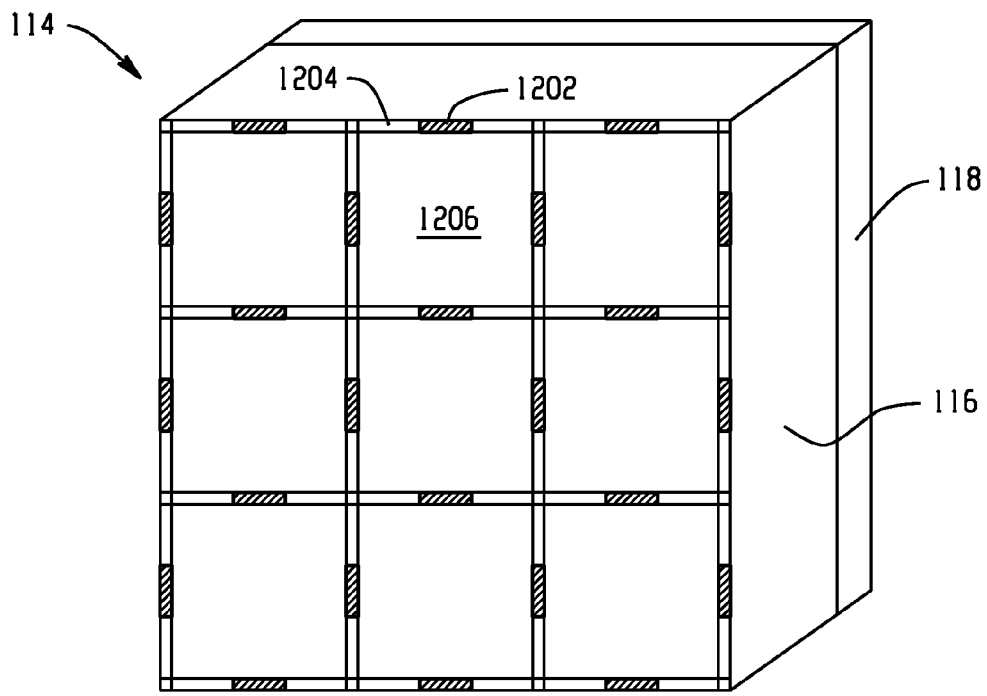
FIGS. 12 and 13 illustrate examples in which heaters are disposed on the radiation sensitive side of a detector module.
Figure 13:
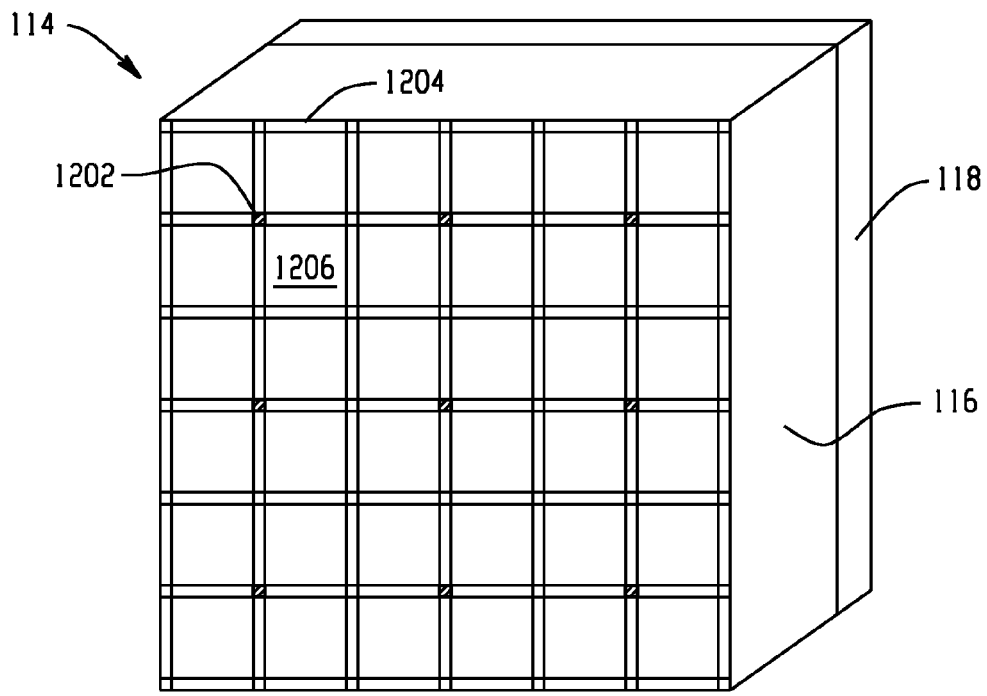

FIGS. 12 and 13 show the module 114 from the radiation sensitive region 116 side.

In FIG. 12, heating elements 1202 are disposed in the spaces 1204 around each of the individual detector pixels 1206 of the detector module 114. The heating elements 1202 are electrically connected to the thermal controller 122 of the electronics 120 through vias or the like. The illustrated location and size of the heating elements 1202 is for explanatory purposes and is not limiting.

In FIG. 13, the heating elements 1202 are disposed at the junction between groups of four detector pixels 1206. Again, the heating elements 1202 are electrically connected to the thermal controller 122 of the electronics 120 through vias or the like. Other groupings of pixels 1206 are also contemplated herein.

In another embodiment, the electronics 120 can additionally or alternatively be used to heat the module 114 by increasing the supply voltage of the electronics 120, for example, based on the sensed and set point temperatures or otherwise.

In another embodiment, the electronics 120 can additionally or alternatively be used to heat the module 114 by increasing the operational frequency of the electronics 120, for example, based on the sensed and set point temperatures or otherwise.

In another embodiment, the electronics 120 can additionally or alternately be used to heat the module 114 by increasing a bias (steady state power) of functional circuitry in the electronics 120.

In another embodiment, the electronics 120 can additionally or alternatively be used to heat the module 114 by increasing the toggle rate of digital components of the electronics 120, for example, based on the sensed and set point temperatures or otherwise.

It is to be appreciated that the temperature control approaches described herein can be employed individually or in combination, and in addition or alternatively to other approaches such as using heaters, fans, heat sinks, etc.

In the embodiments disclosed herein, the electronics 120 occupy a sub-region of the footprint of the substrate 118. In another embodiment, the electronics 120 occupies the same or a substantially similar footprint as the substrate 118.

In another aspect of the invention, the thermal controller unit 122 can be used to facilitate identifying and/or mitigating image artifact. An example is illustrated in connection with FIG. 14.

At 1402, the imaging system 100 is used to scan an object or subject.

At 1404, during scanning, the temperature of one or more of the modules 114 or the entire detector array 112 can be determined via a sensor, such as a sensor 200 as discussed herein or other sensor, and recorded, via the electronics 120 or other circuitry, in memory of the scanner 100 and/or another storage device. The recorded temperatures may or may not be time-stamped via timing circuitry and/or otherwise mapped to the scan.

At 1406, the resulting imaging data (projection and/or volumetric image data) is processed via the console 128, another computer, etc., and artifacts (e.g., ring artifact) are identified therein. Visual observation via film by a human can also be used to facilitate identifying artifact.

At 1408, it is determined that the identified artifacts are at least in part due to the temperature of the one or more modules 114 or array 112. This can be achieved through a software diagnostics or other application executed by the console 128 or other computer based at least in part on the recorded temperatures.

At 1410, a course of action to mitigate the artifact identified.

In one instance, the course of action includes adjusting one or more heater parameters such as the set point temperature for one or more of the modules 114, module temperature feedback control parameters that affect temperature over and/or undershoot about the set point, a flag for deactivating/activating one or more of the heaters on one or more of the modules 114, and/or one or more other parameters. The diagnostic application may recommend an adjustment and/or authorized personnel may determine the adjustment. The action can be performed automatically, semi-automatically (e.g., upon an input from authorized personnel), or manually (through input by authorized personnel). Additionally or alternatively, the course of action may include replacing one or more of the modules 114 or the detector array 112. Additionally or alternatively, the course of action may include changing one or more of the scanning protocols parameters or the scanning protocol.

At least one course of action is implemented and validated, and one or more of acts 1402-1412 are repeated.

Figure 14:
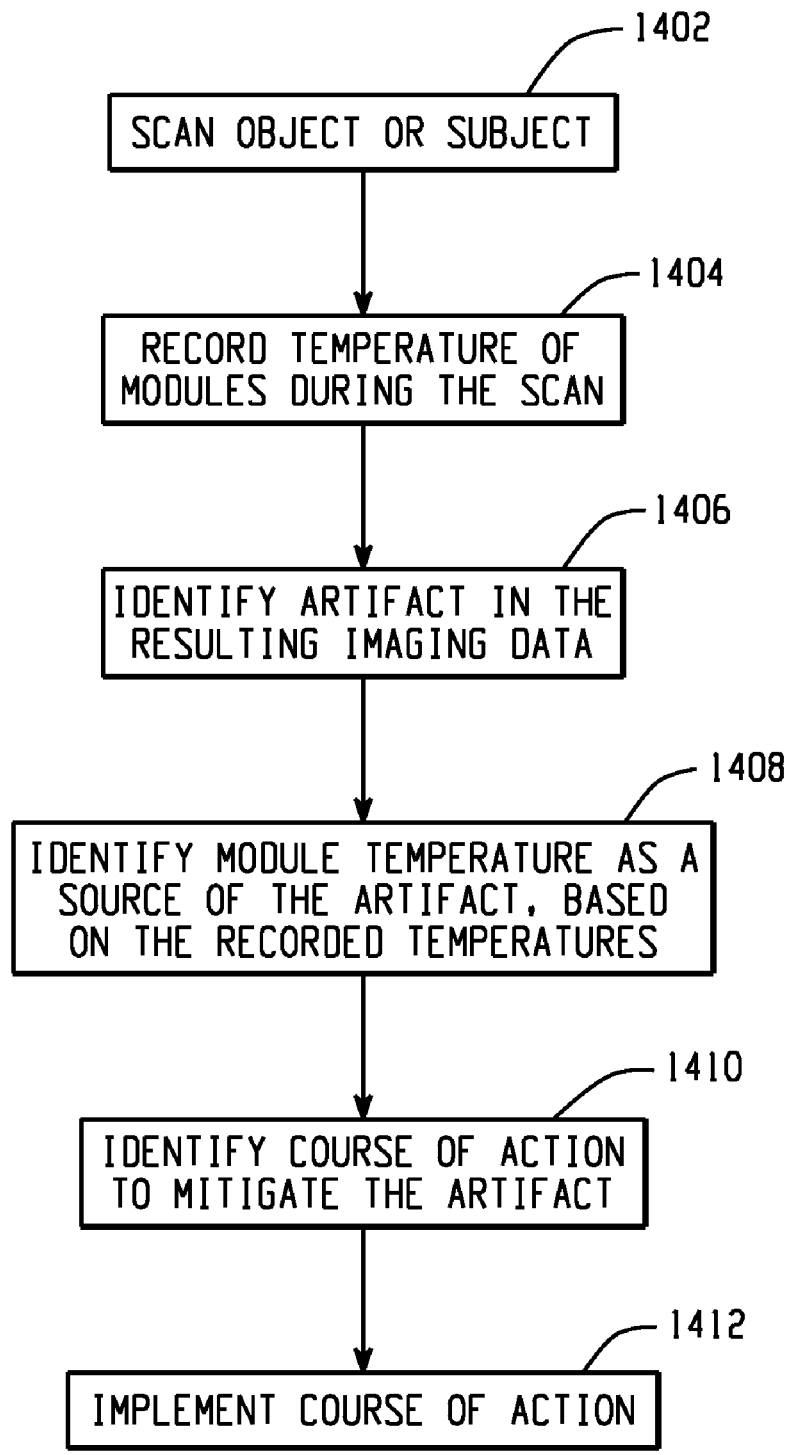
FIG. 14 illustrates a method for identifying and/or mitigating image artifact.

In another aspect of the invention, the method of FIG. 14 can be used during manufacturing, servicing, and/or calibrating the scanner 100 to determine a suitable set point, module temperature feedback control parameters, etc., and/or validate one or more of the modules 114.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. An imaging detector, comprising:
a radiation sensitive region having first and second opposing sides, wherein one of the first or second sides senses impinging radiation; and
electronics located on the other of the first or second sides of the radiation sensitive region, the electronics including:
a thermal controller that regulates a temperature of the imaging detector;
a heater for heating the imaging detector, wherein the thermal controller controls the heater; and
a substrate disposed between the radiation sensitive region and the electronics, wherein the heater is located on the substrate outside of the electronics.

2. The imaging detector of claim 1, the heater comprising:
a transistor, wherein the thermal controller controls power consumption of the transistor.

3. The imaging detector of claim 1, wherein the heater is part of the electronics.

4. The imaging detector of claim 1, the radiation sensitive region comprising:
at least one radiation sensitive pixel; and
at least one non-radiation sensitive region adjacent to the at least one pixel.

5. The imaging detector of claim 4, wherein the heater is located in the at least one non-radiation sensitive region.

6. The imaging detector of claim 4, further comprising:
at least a second radiation sensitive pixel, wherein the at least one non-radiation sensitive region is also adjacent to the at least second pixel and the heater is located between the radiation sensitive pixels in the at least one non-radiation sensitive region.

7. The imaging detector of claim 1, the heater comprising:
a transistor; and
a resistor, wherein the thermal controller controls power consumption of the resistor.

8. The imaging detector of claim 7, wherein the transistor and the resistor are located within the electronics.

9. The imaging detector of claim 7, further including a substrate disposed between the radiation sensitive region and the electronics, wherein the transistor is located within the electronics and the resistor is located on the substrate outside of the electronics.

10. The imaging detector of claim 7, further including a substrate disposed between the radiation sensitive region and the electronics, wherein the transistor and the resistor are both located on the substrate outside of the electronics.

11. The imaging detector of claim 1, the thermal controller comprising:
control logic that generates a signal indicative of a temperature difference between a sensed temperature of the imaging detector and a predetermined set point temperature of the imaging detector.

12. The imaging detector of claim 11, the thermal controller further comprising:
a temperature sensor that senses the temperature of the imaging detector.

13. The imaging detector of claim 11, the thermal controller further comprising:
storage that stores predetermined set point temperature.

14. The imaging detector of claim 1, further comprising:
a plurality of heaters for heating the imaging detector, wherein the plurality of heaters are uniformly distributed about the imaging detector, thereby uniformly heating the imaging detector.

15. The imaging detector of claim 1, wherein the side of the radiation sensitive region sensing the impinging radiation includes an array of radiation sensitive pixels and at least one of the pixels is surrounded by a non-radiation sensitive region, and further comprising: at least one heater for heating the imaging detector, wherein the at least one heater is disposed at least in a sub-portion of the non-radiation sensitive region surrounding the at least one pixel.

16. The imaging detector of claim 1, wherein the thermal controller senses a temperature of the imaging detector, and the sensed temperature is used to determine whether image artifact is based at least in part on the temperature of the imaging detector.

17. A method, comprising:
regulating a temperature of a radiation sensitive detector module with electronics integrated in the radiation sensitive detector module by controlling a supply voltage of the electronics.

18. The method of claim 17, further comprising:
sensing the temperature of the module with a temperature sensor of the electronics and regulating the temperature based on the sensed temperature.

19. The method of claim 18, further comprising:
determining a difference between the sensed temperature and a predetermined set point temperature and regulating the temperature based on the difference in temperature.

20. The method of claim 17, further comprising:
regulating the temperature by controlling power consumption of an electrical component of the module, wherein heat dissipated by the component is used to regulate the temperature.

21. The method of claim 17, further comprising:
regulating the temperature of the module by controlling an operational frequency of the electronics.

22. The method of claim 17, further comprising:
regulating the temperature of the module by controlling a toggle rate of digital components of the electronics.

23. The method of claim 17, wherein the electronics includes at least one heater, and the at least one heater is located on a non-radiation sensitive side of the radiation sensitive detector module.

24. The method of claim 17, wherein the electronics includes at least one heater, and the at least one heater is located within a non-radiation sensitive portion of a radiation sensitive side of the radiation sensitive detector module.

25. The method of claim 17, wherein the electronics includes at least two heaters, and the at least two heaters are uniformly distributed about the radiation sensitive detector module.

26. The method of claim 17, wherein the module is part of an imaging system, and further comprising: recording temperatures of the module while performing an imaging procedure with the imaging system, and determining whether the temperature of module during the imaging procedure contributed to image artifact in imaging data generated by the imaging system for the imaging procedure.

27. The method of claim 26, further comprising:
regulating the temperature of the module based on one or more module temperature control parameters; and
adjusting at least one of the control parameters in response to determining that the temperature of the module contributed to the image artifact.

28. The method of claim 27, wherein the at least one of the control parameter is a temperature set point for the detector module.

29. A radiation sensitive detector module, comprising:
electronics in thermal communication with the radiation sensitive detector module, wherein the electronics regulates a temperature of the radiation sensitive detector module, wherein the module is part of an imaging system, and further comprising: recording temperatures of the module while performing an imaging procedure with the imaging system, and determining whether the temperature of module during the imaging procedure contributed to image artifact in imaging data generated by the imaging system for the imaging procedure.

30. An imaging detector, comprising:
a radiation sensitive region having first and second opposing sides, wherein one of the first or second sides senses impinging radiation, the radiation sensitive region comprising:
    at least one radiation sensitive pixel; and
    at least one non-radiation sensitive region adjacent to the at least one pixel; and
electronics located on the other of the first or second sides of the radiation sensitive region, the electronics including:
    a thermal controller that regulates a temperature of the imaging detector; and
a heater for heating the imaging detector, wherein the thermal controller controls the heater.

31. An imaging detector, comprising:
a radiation sensitive region having first and second opposing sides, wherein one of the first or second sides senses impinging radiation; and
electronics located on the other of the first or second sides of the radiation sensitive region, the electronics including:
    a thermal controller that regulates a temperature of the imaging detector, wherein the thermal controller senses a temperature of the imaging detector, and the sensed temperature is used to determine whether image artifact is based at least in part on the temperature of the imaging detector.

32. A method, comprising:
regulating a temperature of a radiation sensitive detector module with electronics integrated in the radiation sensitive detector module by controlling a toggle rate of digital components of the electronics.

33. A method, comprising:
regulating a temperature of a radiation sensitive detector module with electronics integrated in the radiation sensitive detector module, wherein the electronics includes at least one heater, and the at least one heater is located within a non-radiation sensitive portion of a radiation sensitive side of the radiation sensitive detector module.

* * * * *